Patented Jan. 3, 1933

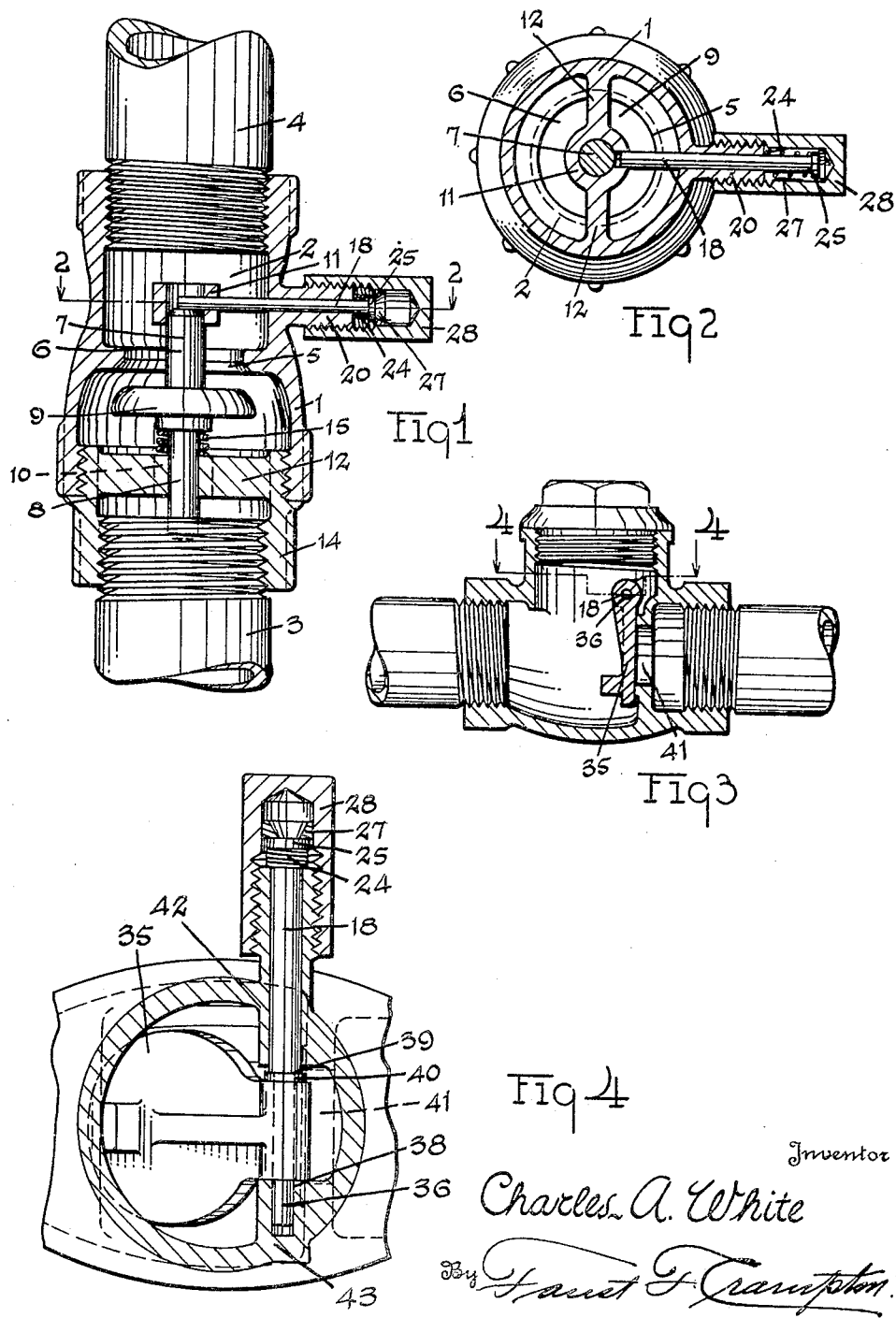
Jan. 3, 1933. C. A. WHITE 1,892,921
SAFETY VALVE
Filed Feb. 18, 1932

1,892,921

UNITED STATES PATENT OFFICE

CHARLES A. WHITE, OF TOLEDO, OHIO

SAFETY VALVE

Application filed February 18, 1932. Serial No. 593,813.

This invention relates to valves, the operation of which is controlled by means responsive to an increase in heat which may be transmitted to the valve or its parts to diminish the flow of a fluid through the valve and its connected pipe lines.

The invention has for its particular object to provide automatic means for closing the valve upon the outbreak of a fire or the existence of temperature conditions in the neighborhood of the valve as would cause increased danger by explosion or combustion, if the fluid were permitted to flow in undiminished quantities through the valve and therefore provides a valve readily adaptable to pipe lines which transmit gasoline, ammonia, fuel gas, and the like. The invention has also for its object to provide means for supporting a valve control member in a position so that it may be automatically withdrawn from engagement with the valve member and will withstand the strain of springs or other valve operating means to hold the valve open against the constant force applied on the valve member by such operating means.

The invention has for a further object to support a heat responsive material which controls the valve operation in a position so as to be exposed to the temperature conditions surrounding the valve.

The invention further has for its object to provide a simple construction for an automatic safety valve which may be produced at low cost. The invention consists in other features and advantages which will appear from the following description and upon examination of the drawing. Structures containing the invention may partake of different forms and may be varied in their details and still embody the invention. To illustrate a practical application of the invention I have selected a safety valve and one of its modifications embodying the invention as an example of the various structures and details thereof that contain the invention, and shall describe the selected structures hereinafter, it being understood that variations may be made and that certain features of my invention may be used to advantage without a corresponding use of other features of the invention and without departing from the spirit of the invention. The particular structures selected are shown in the accompanying drawing.

Fig. 1 illustrates a view of a longitudinal section through the valve, the parts thereof being shown open. Fig. 2 illustrates a view of a section taken on the plane of the line 2—2 indicated in Fig. 1, the parts being shown closed. Fig. 3 illustrates a view of a longitudinal section of a modified form of construction shown closed. Fig. 4 illustrates a view of a section taken on the plane of the line 4—4 indicated in Fig. 3, certain of the parts being shown in an open condition.

It is well known that, in fires occuring in buildings, a related danger is that of explosion or further conflagration of gasoline, ammonia and fuel gas from pipe lines which have been broken, due to melting or destruction of the pipe joints by the heat of the fire. Often it becomes impossible to reach a shut-off valve before the vicinity is surrounded by flames, or the temperature has increased above the safety point for the materials within the pipe line. In many instances, meter boxes and other measuring apparatus in the line melt or distort at their joints upon being exposed to only a substantially slight increase in temperature and permit the escape of gases so that a fire of only slight consequence may readily develop by being fed with the escaping gas or liquid into one of much greater dimensions and destructional quality.

In my invention, the valve is provided with a protruding metal shell which contains a stop or plug formed of material of a substantially low melting point, and a valve control pin which is released by the plug when the atmosphere surrounding the valve becomes heated, thereby allowing the valve to close and shut off the flow of the gas or fluid. The valve may be located in the line connected to the source of supply intermediate the point of connection with the meter or outlet side of the line. In the use of the valve in lines for transmitting liquids it has been found advantageous to locate the valve close to the floor so that the valve may be exposed to the heat of the spilled and inflamed liquid and promptly close the line.

In the form of construction shown in Fig. 1, the casing 1 of the valve has a passageway 2 for communication between the pipes 3 and 4. The passageway is restricted by an inwardly extending flange part forming a suitable valve seat 5. A valve member 6 is supported by spindles 7 and 8 and comprises an annular flange 9, the edges of which are beveled to correspondingly fit the valve seat 5. The spindles 7 and 8 extend concentrically with the axis of the valve casing 1 and are slidably mounted in collars 10 and 11 supported in the passageway 2 by arms or webs 12, which extend from the wall of the casing 1. To facilitate installation of the valve member 6, the collar 10 is formed as an integral part of an end member 14 threaded into and forming an end of the casing 1. A suitable spring 15 is located between the flange 9 of the valve member 6 and the collar 10 to assure rapid and positive movement of the valve member 6 in closing the passageway 2 between the pipes 3 and 4.

In order to hold the valve member in an open position, a control pin 18 is adapted to engage the spindle 7 of the valve member and hold the valve member against the compression of the spring 15, which is compressed by opening the valve. The pin 18 is located relative to the supporting spindle 7 of the valve member 6 so that it may be readily withdrawn from its engaging position upon an increase in temperature in the atmosphere surrounding the valve. The pin 18 extends through the wall of the valve casing 1 so as to extend through a boss 20 which is formed thereon. The outer end of the pin 18 is thus located exterior of the valve and its movement is controlled by a suitable means responsive to a rise in temperature, such as may be caused by fire.

In order to withdraw the end of the pin 18 from engagement with the spindle 7, the pin 18 may be moved as by a spring 24 located between a head 25 formed on the outer end of the pin and the boss 20. The pin 18 is held in engagement with the spindle 7 against the force of the spring 24 by a plug 27 formed of fusible material. The plug 27 is located in a shell or cap 28 which is threaded onto the boss 20. The cap 28 may be located on the boss so that there will be sufficient compression of the spring 24 as to assure quick response of the spring and the pin 18 upon melting of the fusible material. Thus, heat, conducted or transmitted to the wall of the cap 28, will cause the melting of the plug 27 to release the head 25 of the pin 18 and allow the spring 24 to force the pin 18 outwardly into the cap 28. The inner end of the pin will disengage the spindle 7, releasing the spring 15 to move and close the valve member 6. Further movement of gas or fluid through the valve and the connected pipe line will be prevented.

In the modified form of construction illustrated in Figs. 3 and 4, the pin 18 may be adapted to frictionally engage the valve member. The pin 18 of the modified form is provided with a shank 36 of a diameter less than the diameter of the body portion of the pin forming a shoulder 39. The pin 18 extends through the wall 42 of the valve body and into a socket 38 formed in the wall 43 of the valve body. The valve member is rotatably supported on the pin 18 so that when the pin 18 is forced inwardly the valve member 35 will be frictionally engaged by the shoulder 39 to grip the valve member between the shoulder and the wall 43. If desired, a suitable washer 40 may be located on the shank 36 and adjacent the shoulder 39 to increase the frictional engagement with the valve member. The pin 18 may be held by the plug 27 and moved by a spring 24, as described above, so that upon an application of heat, the spring will be released and the pin 18 will shift to move the shoulder and washer from frictional engagement with the valve member 35. The member 35 will, by its own weight, swing downward, as shown in Fig. 3, and close the valve.

I claim:

1. In a valve, a valve member for closing the valve, said valve member having a tendency to move in one direction, a slidable means for engaging the valve member, a plug formed of material of a low melting point for holding the slidable means in an engaging position with the valve member, and an elastic means for moving said slidable means to release the valve member when said plug is fused.

2. In a valve, a valve member for closing the valve, said valve member having a tendency to move in one direction, a pin supported in the valve casing at right angles to the line of movement of the valve member, a spring in engagement with the pin, a cap, a plug formed of material having a low melting point located in the cap for holding the pin in engaging relation with the valve member against the force of the spring.

3. In a valve, a valve member for closing the passageway of the valve, a pin supported by the valve casing for rotatably supporting the valve member, a shoulder formed on the pin, a cap, a plug formed of a material of a low melting point located in the cap for engaging the pin to hold the shoulder in frictional engagement with the valve member.

In witness whereof I have hereunto signed my name to this specification.

CHARLES A. WHITE.